United States Patent
Mitelman et al.

(10) Patent No.: US 12,159,187 B1
(45) Date of Patent: Dec. 3, 2024

(54) SYSTEMS AND APPROACHES FOR DISSIPATING HEAT IN BI-OPTIC READER

(71) Applicant: ZEBRA TECHNOLOGIES CORPORATION, Lincolnshire, IL (US)

(72) Inventors: Yuly Mitelman, Stony Brook, NY (US); Ryan R. Gallagher, Port Jefferson, NY (US); Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/387,239

(22) Filed: Nov. 6, 2023

(51) Int. Cl.
*G06K 7/10* (2006.01)

(52) U.S. Cl.
CPC ....... *G06K 7/1092* (2013.01); *G06K 7/10851* (2013.01); *G06K 7/1098* (2013.01)

(58) Field of Classification Search
None
See application file for complete search history.

(56) References Cited

U.S. PATENT DOCUMENTS

| | | | | |
|---|---|---|---|---|
| 5,949,056 A | * | 9/1999 | White | G06K 7/10584 235/472.01 |
| 5,969,321 A | * | 10/1999 | Danielson | G06K 7/10811 235/462.23 |
| 2019/0205583 A1 | * | 7/2019 | Bruni | G06K 7/10722 |

* cited by examiner

*Primary Examiner* — Kristy A Haupt
(74) *Attorney, Agent, or Firm* — Yuri Astvatsaturov

(57) ABSTRACT

At least some embodiments of the present invention are directed to barcode readers having a housing with upper and lower portions, and a platter. Additionally, the barcode readers include a platter frame and an imaging assembly, the first imaging assembly having a first field of view (FOV) directed through at least one of the substantially horizontal window or the substantially upright window of the housing, and a reader accessory removably coupled with at least one of the lower housing portion or the platter frame that includes a thermal transmitter. The thermal transmitter is thermally coupled with at least one of the housing frame or the platter frame to transfer thermal energy generated by the reader accessory thereto.

26 Claims, 8 Drawing Sheets

SYSTEMS AND APPROACHES FOR DISSIPATING HEAT IN BI-OPTIC READER

BACKGROUND

Bi-optic barcode readers are commonly used in retail and grocery store venues to help facilitate various transaction. In particular, these bi-optic barcode readers rely on image data captured by one or more image sensors to conduct image analysis and perform various functions based on that analysis. As these readers continue to advance technologically and become capable of performing more tasks, such readers may incorporate higher-powered components therein. In light of this, there is a continued need for further development associated with the ability to gather image-based data for bi-optic barcode reader use in addition to efficiently handling heat generated by such higher-powered systems.

Accordingly, there is a need for improved accessories having improved functionalities.

SUMMARY

Barcode readers and assemblies are disclosed herein that include a housing having lower and upper housing portions, a platter, an imaging assembly, and a reader accessory. The lower housing portion has an upper surface facing a product scanning region, a substantially horizontal window, and a housing frame. The upper housing portion extends above the lower housing portion with a substantially upright window. The platter supports an object placed thereon, and includes a central region extending in a transverse plane that includes a platter window, and further includes a platter frame. The imaging assembly has an imaging sensor and has a field of view (FOV) directed through at least one of the substantially horizontal window or the substantially upright window. The reader accessory is removably coupled with at least one of the lower housing portion or the platter frame and includes a thermal transmitter that removes thermal energy generated by the reader accessory therefrom. The thermal transmitter is thermally coupled with at least one of the lower housing frame or the platter frame to transfer the thermal energy generated by the reader accessory thereto.

In some examples, the reader accessory includes a supplemental module removably coupled with at least one of the lower housing portion or the platter frame. The supplemental module may include at least one supplemental sensing assembly. In some of these examples, the thermal transmitter may include a thermally conductive material that is positioned at or near a portion of the supplemental sensing assembly. In yet others of these examples, the thermally conductive material may include at least a portion of the supplemental module housing. In other examples, the supplemental module may include a supplemental module housing having an opening extending therethrough. The thermally conductive material may be at least partially disposed through the opening.

In some forms, the supplemental sensing assembly includes at least one of a barcode imager, a vision camera, a proximity sensor, an IR sensor, a 3D sensor, or an off-platter detection sensor.

In some examples, the reader accessory may include a supplemental processing assembly that has at least one circuit board and a supplemental processing housing operably coupled therewith. In these examples, the thermal transmitter may include at least a portion of the supplemental processing housing. Further, in some examples, the supplemental processing housing may include a thermal flow path comprising a region having an increased cross-sectional dimension relative to a remainder of the supplemental processing housing, the thermal flow path adapted to direct thermal energy to the housing frame and/or the platter frame.

In some examples, at least one of the housing frame or the platter frame is constructed from a metallic material. In other examples, the housing frame may include at least one of a diecast frame or a sheet frame. In yet other examples, at least one of the housing frame or the platter frame may include at least one rib or fin to assist with heat dissipation. In other examples, at least one of the housing frame or the platter frame is coupled with a heat-dissipative ground external to the reader.

In accordance with a second aspect, a barcode reader includes a housing having a lower housing portion and an upper housing portion, a platter, an imaging assembly, a frame member, and a reader accessory. The lower housing portion has an upper surface facing a product scanning region and a substantially horizontal window. The upper housing portion extends above the lower housing portion and has a substantially upright window. The platter supports an object placed thereon and includes a central region extending in a transverse plane. The central region includes a platter window configured to permit light to pass therethrough. The imaging assembly has an imaging sensor and a field of view (FOV) directed through at least one of the substantially horizontal window or the substantially upright window. The frame member provides structural support to at least one of the housing or the platter. The reader accessory is removably coupled with at least one of the lower housing portion or the platter and includes a thermal transmitter adapted to remove thermal energy generated by the reader accessory therefrom. The thermal transmitter is thermally coupled with the frame member to transfer the thermal energy generated by the reader accessory thereto.

In accordance with a third aspect, a barcode reader includes a housing having a lower housing portion and an upper housing portion, a platter, an imaging assembly, a reader accessory, and a thermal dissipation device. The lower housing portion has an upper surface facing a product scanning region and a substantially horizontal window. The upper housing portion extends above the lower housing portion and has a substantially upright window. The platter supports an object placed thereon and includes a central region extending in a transverse plane. The central region includes a platter window configured to permit light to pass therethrough. The imaging assembly has an imaging sensor and a field of view (FOV) directed through at least one of the substantially horizontal window or the substantially upright window. The reader accessory is removably coupled with at least one of the lower housing portion or the platter and includes a thermal transmitter adapted to remove thermal energy generated by the reader accessory therefrom. The thermal dissipation device is operably coupled with the thermal transmitter and is adapted to dissipate the thermal energy generated by the reader accessory thereto.

In accordance with a fourth aspect, a barcode reader includes a housing having a lower housing portion and an upper housing portion, a support frame, and a heat generating element associated with the barcode reader. The lower housing portion has an upper surface facing a product scanning region and a substantially horizontal window. The upper housing portion extends above the lower housing portion and has a substantially upright window. The support frame is positioned around or within the perimeter region of the lower housing portion. The heat generating element is thermally coupled with the support frame such that the support frame dissipates thermal energy generated by the heat-generating element.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
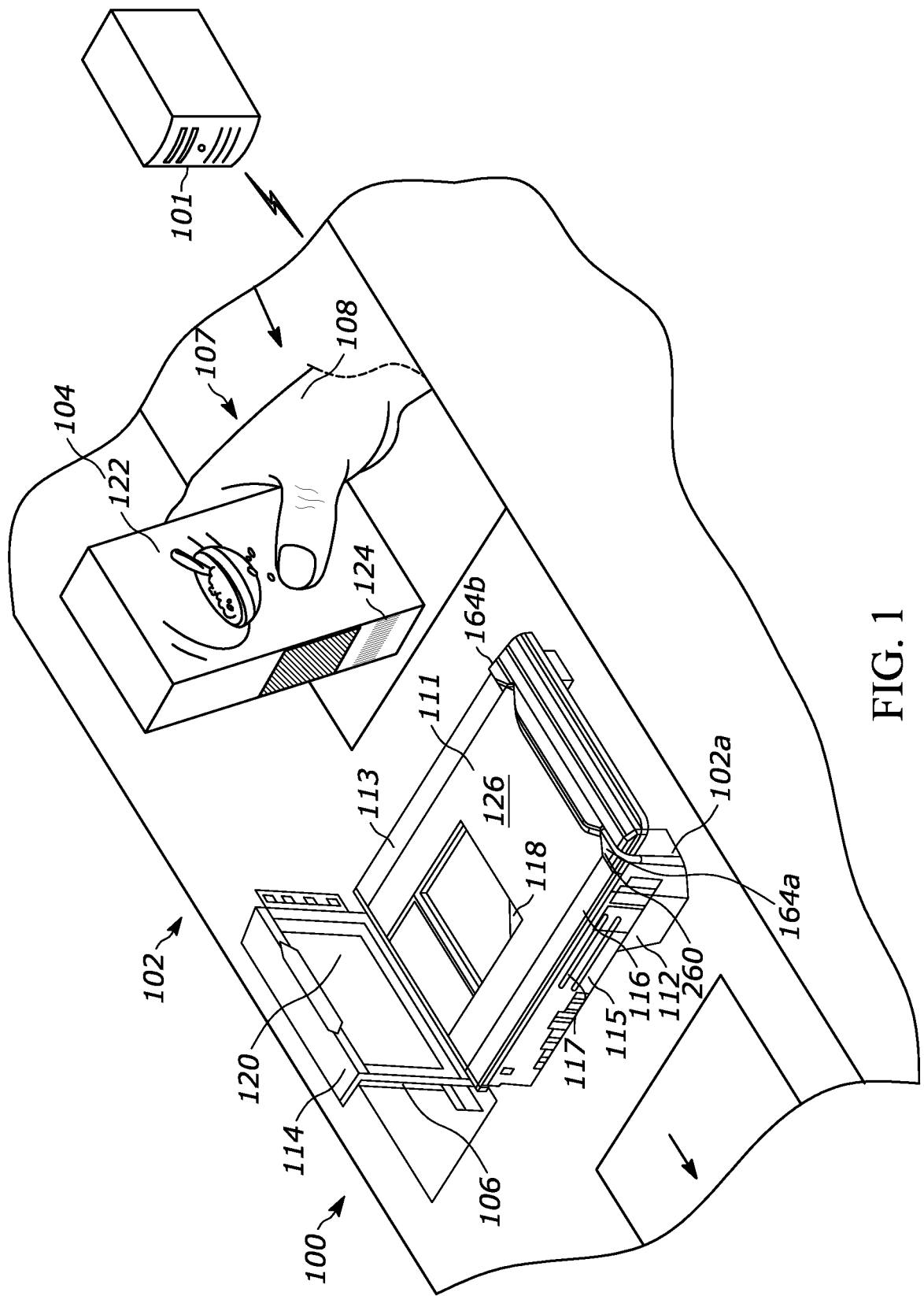
FIG. 1 is a perspective view of an example imaging system, implemented in an example point-of-sale (POS) system, having a bi-optical (also referred to as "bi-optic") barcode reader having a platter (such as, for example, a weigh platter) in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, example barcode readers are provided that include a novel heat dissipation arrangement that effectively removes heat generated by a heat-generating element. In some examples, such heat-generating element may be in the form of a supplemental or add-on assembly used to enhance the capability of the barcode reader. More specifically, in some arrangements, the supplemental module may provide improved scanning performance of objects positioned near or otherwise adjacent to the barcode reader. Notably, the heat dissipation arrangements described herein incorporate structural and/or frame members of the reader and/or environment, thereby limiting the use of additional components that may otherwise increase costs and complexity. Put differently, because these large structural components may be readily available in the barcode reader in order to achieve required rigidity levels for proper performance, the structural members may be advantageously used for the additional purpose of dissipating heat from the device.

FIG. 1 illustrates a perspective view of an example imaging system capable of implementing operations of the example devices. In the illustrated example, an imaging system 100 is in the form of a point-of-sale (POS) system, having a workstation 102 with a workstation surface (e.g., a counter) 104 and a bi-optical (also referred to as "bi-optic") barcode reader 106.

In the illustrated example, the barcode reader 106 includes an upper housing 114 (also referred to as an upper portion, tower portion, or upper housing portion) and a lower housing 112 (also referred to as a lower portion, platter portion, or lower housing portion). The upper housing 114 is characterized by an optically transmissive window 120 positioned there along a generally vertical plane and a horizontally extending field of view(s) which passes through the window 120. The lower housing 112 is characterized by a platter 111 that includes an optically transmissive window 118 positioned there along a generally horizontal plane and a vertically extending field of view(s) which passes through the window 118. The platter 111 may be a part of a platter assembly that supports an item 122 being placed thereon. In some examples, the platter assembly may include the platter 111 and a scale configured to measure the weight of the item 122 placed on an example surface of a top portion 116, or some portion thereof. The platter 111 may include a platter frame 113 that provides support and which may be coupled with a portion of the lower housing (e.g., a support frame 115). In some examples, the platter frame 113 and/or the support frame 115 may be constructed from sheet metal or may be diecast. Other examples are possible.

While in some instances the platter 111 is fixedly secured with the support frame 115 of the lower housing 112, in other implementations it is removable by the barcode reader operator. This can be done to, for example, clean under the platter or to replace the platter after wear and tear. As used herein, the term near should at least be interpreted as being within two inches from a given feature. In other implementations, the term near should at least be interpreted as being within one inch, half inch, or quarter inch from a given feature.

In operation, a user 108 generally passes the item 122 across a product scanning region of the barcode reader 106 in a swiping motion in the general direction 107, which in the illustrated example is right-to-left. It should be appreciated that while items may be swiped past the barcode reader 106 in either direction, items may also be presented into the product scanning region by means other than swiping past the window(s). When the item 122 comes into the any of the fields of view of the reader, the barcode 124 on the item 122 is read and decoded by the barcode reader 106 and corresponding data is transmitted to a communicatively coupled host 101. In other instances, items may need to be weighed in order to be added to the ledger of the transaction. In this case, an item is placed on the top surface 116 of the platter 111 for the barcode reader 106 to sense the weight of said item and transmit information associated with this weight to the host 101. Additionally, image data may be processed for other purposes, such as, for example, potential ticket switching, sweethearting, or other types of shrink-related events. Further to that, image data captured by various imaging assemblies may be used for other purposes like, transitioning from a stand-by mode to a reading mode (i.e., waking up a scanner).

In a preferred embodiment the platter 111 of the barcode reader 106 has various features. Specifically, it includes a central region 126 extending in a transverse plane. In most cases the central region 126 includes a platter window 118 configured to permit light to pass therethrough. This light may both, be emitted from within the lower housing 112 and travel into the interior of the lower housing 112 for capture by various imaging components.

Figure 2:
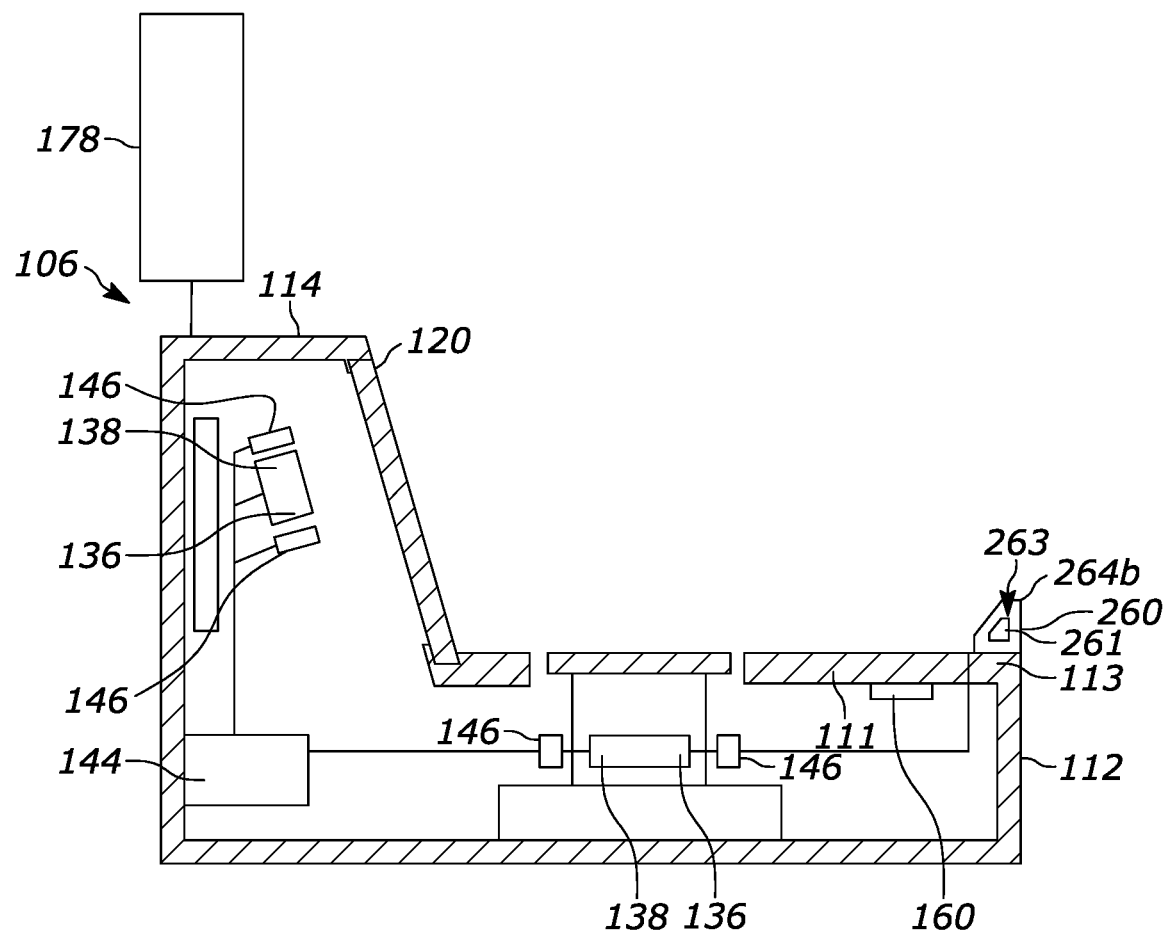
FIG. 2 is a schematic block diagram of an example barcode reader in accordance with an embodiment of the present invention.
Figure 3:
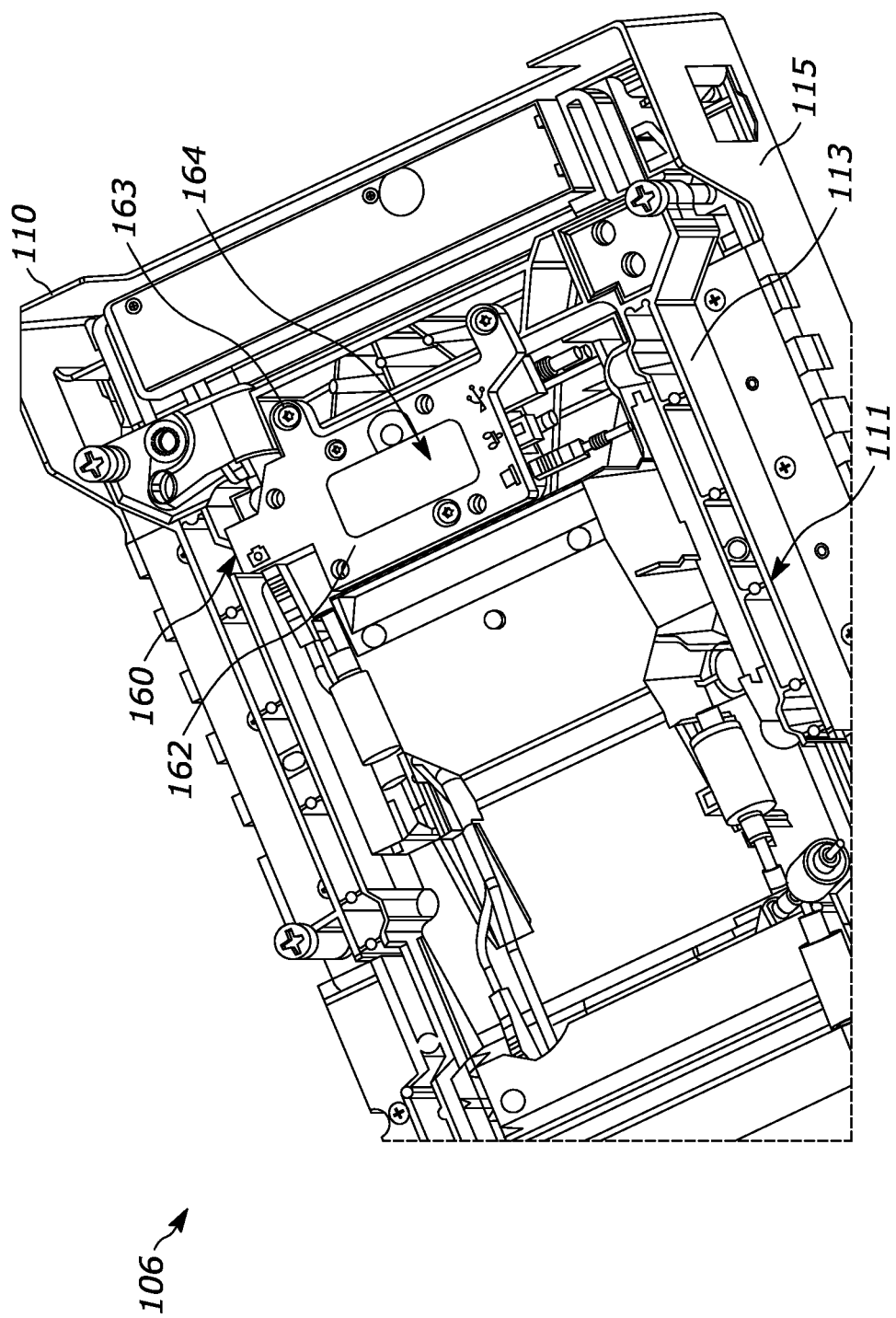
FIG. 3 is a perspective view of the example barcode reader of FIG. 1 having an example reader accessory coupled thereto in accordance with an embodiment of the present invention.

As can be seen in the block diagram of FIG. 2, the barcode reader 106 includes at least one imaging assembly 136 that includes an imaging sensor 138 with a respective imaging lens or lens group. Imaging sensor 138 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by the respective lens group over an imaging field of view (FOV) along an imaging axis that is normal to the substantially flat image sensor 138 through the substantially upright window 120 or the substantially horizontal window 118. The return light is scattered and/or reflected from an item over the FOV. In some embodiments, the imaging axis is coaxial with a central axis of the lens group. The lens group is operative for focusing the return light onto the array of pixels to enable the characteristics (e.g., barcode(s)) associated with the item to be read. In particular, the light that impinges on the pixels is sensed and the output of those pixels produce image data that is associated with the environment that appears within the FOV (which can include the target). This image data may be processed by a controller 144 (e.g., by being sent to a decoder) which identifies and decodes decodable indicia captured in the image data. Once the decode is performed successfully, the reader can signal a successful "read" of the target (e.g., a barcode).

In addition to the imaging sensor 138, the imaging assembly 136 can include one or more illumination sources 146 operable to provide light that is directed into the product scanning region through the substantially upright window 120 or the substantially horizontal window 118. Under typical conditions, when the imaging sensor 138 is operating to capture light from the product scanning region to produce image data, illumination sources 146 are activated to provide illumination of the target and hence enhance visibility of the target as "seen" by the imaging sensor 138. In a preferred embodiment, the one or more illumination sources 146 comprise a light emitting diode (LED) that is synchronized, at least partially, with the exposure of the imaging sensor 138.

It should be appreciated that the barcode reader 106 can be configured with one or more primary imaging assemblies that direct various FOVs through the combination of the substantially vertical and substantially horizontal windows 120, 118. To that end, if a single imaging assembly is used, various mirror arrangements can be employed to split the assembly's FOV and direct one portion of that FOV through window 120 and direct another portion of that FOV through windows 118. This can include one or more splitter mirrors and/or one or more folding mirrors whereby the various portions of the FOV can be directed in a desired manner.

Alternatively, and as illustrated, multiple imaging assemblies can be used. For example, the barcode reader 106 can employ a second imaging assembly having similar features and operation as the imaging assembly 136. It is to be appreciated that any of the imaging assemblies 136 may be in the form of a bioptic scanner.

While not expressly illustrated, it should be appreciated that the position and orientation of the imaging assemblies disclosed herein are merely provided as examples, and unless otherwise indicated, these assemblies can be positioned anywhere within the upper and lower housing along with any mirrors which allow for any of the one or more FOVs to be redirected in a desired manner.

With particular reference to FIGS. 3-7, the bi-optic barcode reader 106 further includes any number or reader accessories 160. The reader accessory 160 may be removably coupled with one or both of the platter frame 113 or the support frame 115. Generally speaking, the reader accessory 160 is provided to supplement the performance of the barcode reader 106, thereby allowing the barcode reader 106 to perform additional operations and/or operate with increased power and/or efficiency. In some forms, the reader accessory 160 may be in the form of a supplemental processing assembly. The reader accessory 160 may include an accessory housing 162 (or supplemental processing housing), electronic components (also herein referred to as circuitry and/or a circuit board) 164, and a thermal transmitter (also herein referred to as a thermal dissipation device) 166. In the illustrated example, the reader accessory 160 is in the form of a video upgrade module that includes a processor that provides machine vision capabilities. For example, the video upgrade module may be used in object identification, facial recognition, gesture recognition, and loss prevention applications such as ticket switching and/or scan avoidance. Other examples are possible. Such a module may have high processing demands and/or illumination requirements that may result in additional heat generation.

Figure 4:
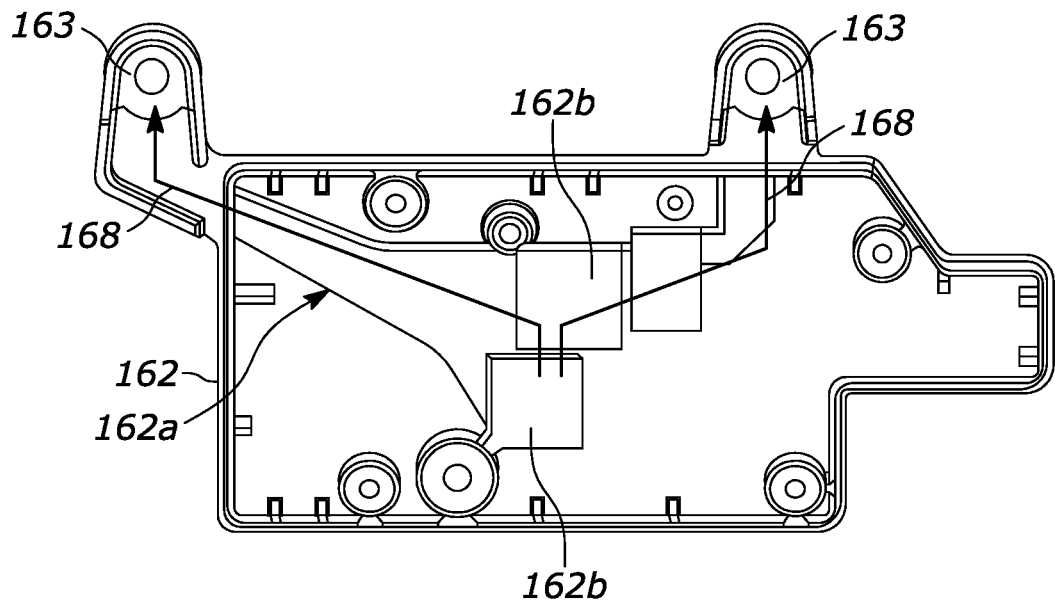
FIG. 4 is a bottom view of an example accessory housing of the example reader accessory in accordance with an embodiment of the present invention.
Figure 5:
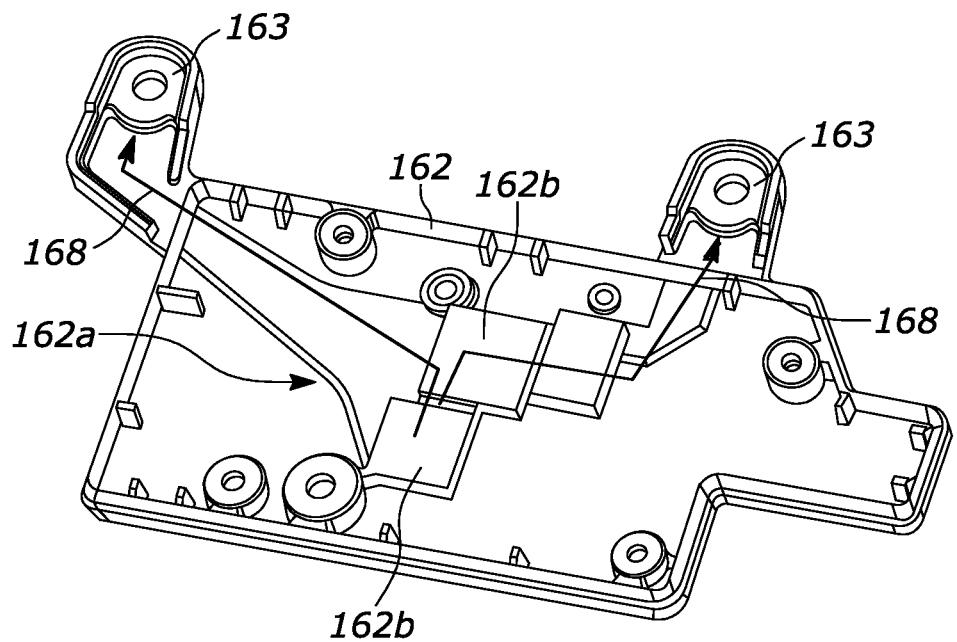
FIG. 5 is a bottom perspective view of the example accessory housing of the example reader accessory in accordance with an embodiment of the present invention.
Figure 6:
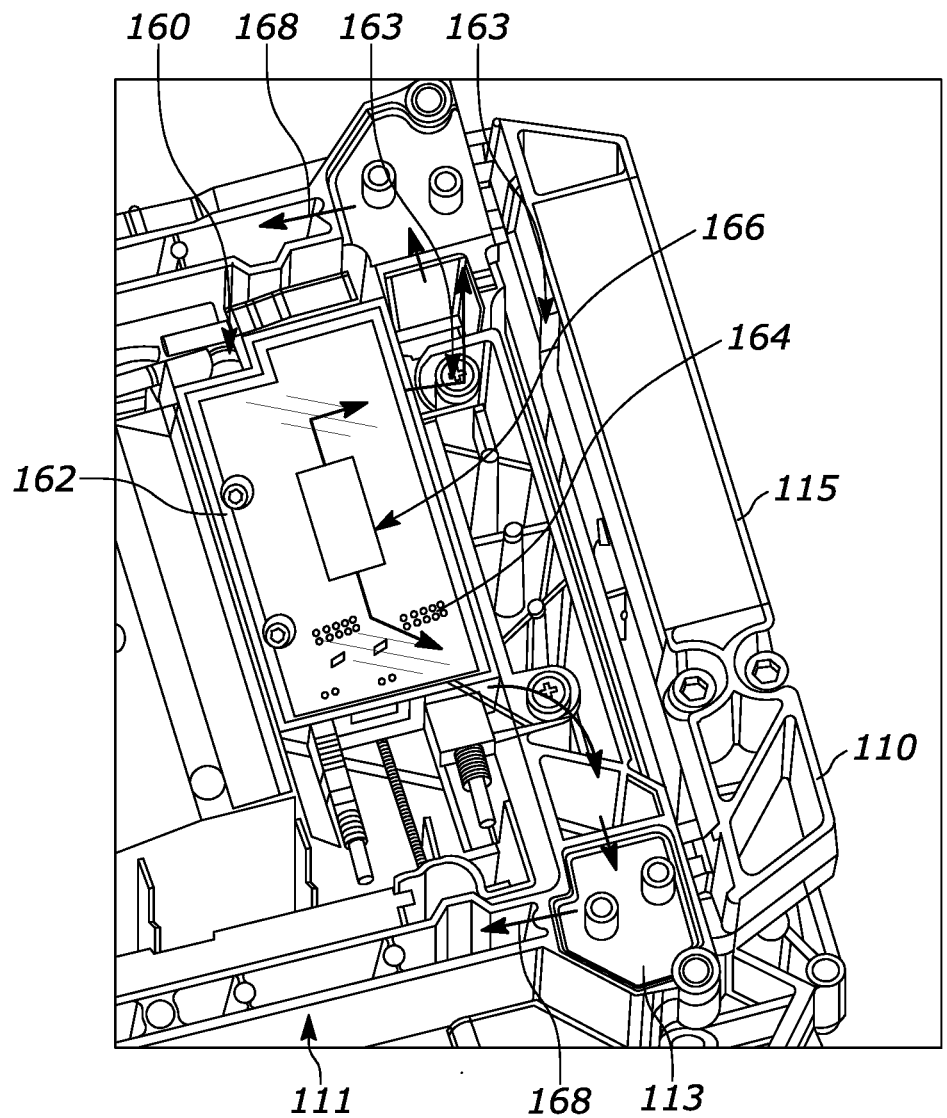
FIG. 6 is a perspective view of an example thermal flow path of the example reader accessory in accordance with an embodiment of the present invention.
Figure 7:
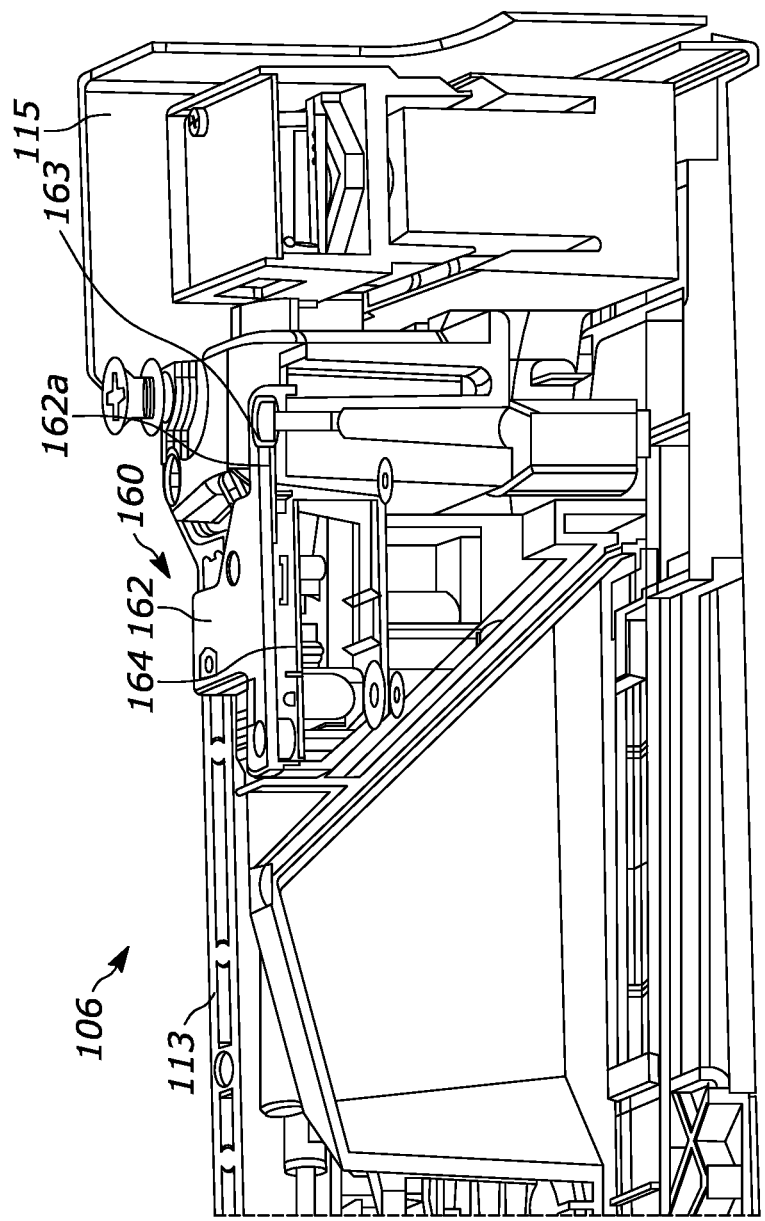
FIG. 7 is a cross-sectional view of the example imaging system and example reader accessory in accordance with an embodiment of the present invention.

Accordingly, as illustrated in FIG. 6, the reader accessory 160 includes a thermal transmitter 166 in the form of a thermal pad or other thermally conductive material that is thermally coupled with the electronic components 164 and a portion of the accessory housing 162. The accessory housing 162 is constructed from a metallic or other thermally transmissive material, and as illustrated in FIGS. 4 and 5, includes a portion 162a defining an increased cross-sectional dimension (e.g., thickness) with respect to the remainder thereof. The portion 162a additionally includes a pad placement region 162b that is configured to abut the thermal transmitter 166 when the accessory housing 162 is coupled with the electronic components 164. As a result, the accessory housing 162 acts as an initial heat sink to transfer thermal energy generated by the electronic components 164.

As illustrated in FIGS. 4 and 5, the portion 162a extends from a generally central region of the accessory housing 162 to a mounting portion 163 located near the periphery thereof. In the illustrated example, the mounting portion 163 is in the form of a hole that receives a screw or bolt (which, in some examples may be constructed from a thermally transmissive material) to seal the accessory housing 162 as well as to couple the entire reader accessory 160 with the platter frame 113 and/or the support frame 115 of the lower housing 112. Notably, securing the accessory housing 162 not only provides a physical securement with the platter frame 113 and/or the support frame 115, but also provides for a thermal coupling between these components. More specifically, as illustrated in FIG. 6, a thermal flow path 168 is formed from the circuitry 164 to the thermal transmitter 166, through the accessory housing 162 (not illustrated in this FIG. for the sake of clarity) along the portion 162a, to the mounting portion 163, and through the platter frame 113 and/or the support frame 115.

In some examples, because the platter frame 113 and/or the support frame 115 are constructed from metallic materials, they to operate as a heat sink to assist with dissipating thermal energy generated by the reader accessory 160. Further, because the platter frame 113 and/or the support frame 115 are relatively large with respect to the reader accessory 160, they may provide increased heat dissipation. In some environments, the platter frame 113 and/or the support frame 115 may be open to air for convective dissipation, as there may be space for open airflow around the reader 106 on a number of sides of the unit.

Figure 8:
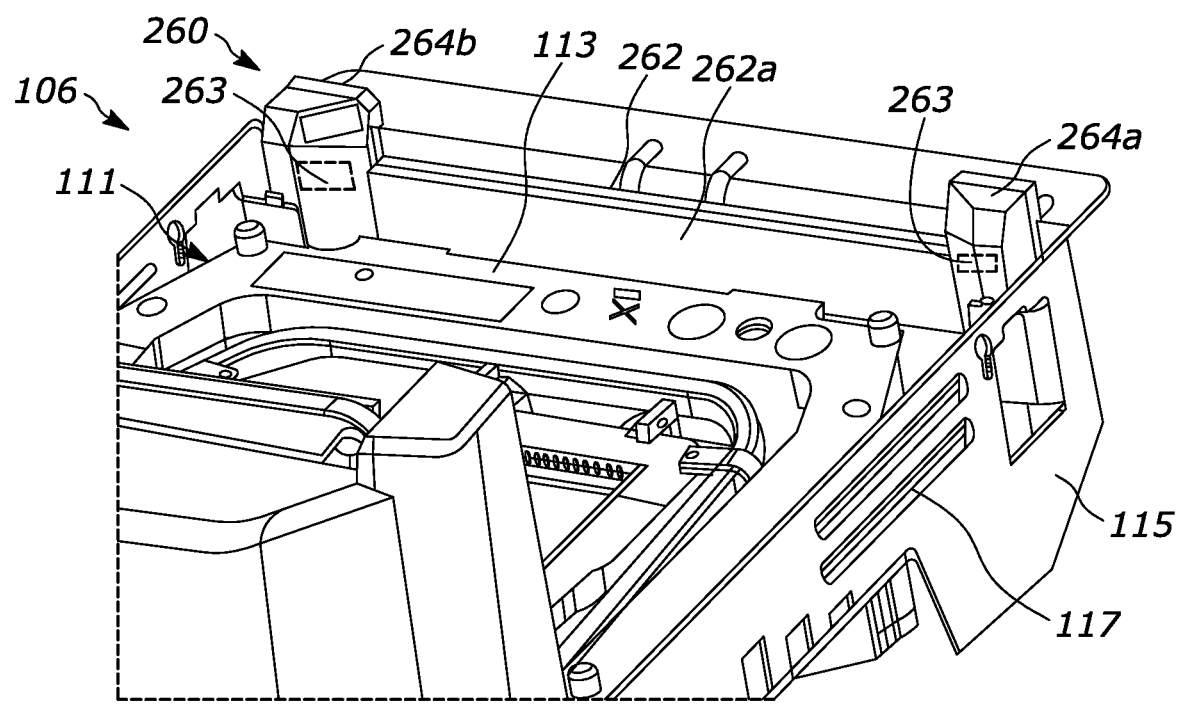
FIG. 8 is a perspective view of an alternative example barcode reader having an alternative reader accessory in the form of a supplemental module for use with the barcode reader of FIG. 1 in accordance with an embodiment of the present invention.
Figure 9:
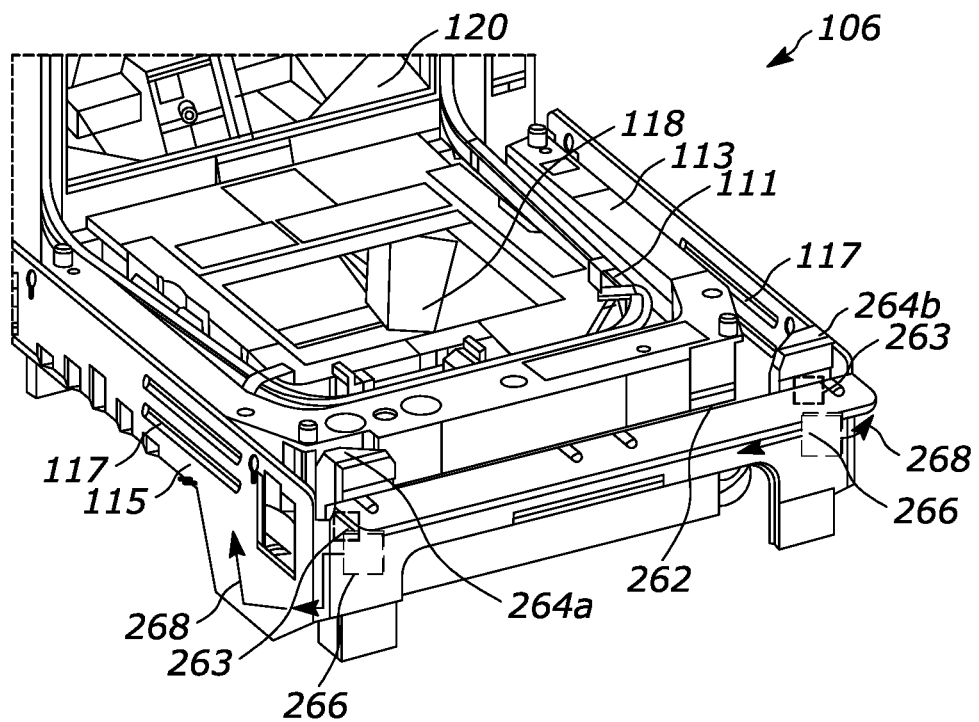
FIG. 9 is a perspective view of the example barcode reader of FIG. 8 in accordance with an embodiment of the present invention.

Turning to FIGS. 8 and 9, an alternative reader accessory 260 is provided to be used with the example barcode reader 106. It is to be appreciated that this alternative reader accessory 260 may be used separately or in conjunction with the reader accessory 160. In this example, the reader accessory 260 is in the form of a supplemental module that includes any number of supplemental sensing assemblies 261. In the illustrated example, the reader accessory 260 is positioned near a distal edge of the platter 111. While the illustrated examples depict a reader accessory 260 that includes two supplemental sensing assemblies 262, it is to be appreciated that other implementations may include fewer or more imaging assemblies as desired.

As with the previously described imaging assembly or assemblies 136, in some examples, the supplemental sensing assemblies 261 may be supplemental imaging assemblies (not illustrated). More specifically, in some arrangements, a first supplemental imaging assembly may include an imaging sensor with a respective imaging lens or lens group, and similarly, a second supplemental imaging assembly may include an imaging sensor with a respective imaging lens or lens group. In some examples, the imaging sensors are solid-state devices, for example, CCD or a CMOS imagers, having a one-dimensional array of addressable image sensors or pixels arranged in a single row, or a two-dimensional array of addressable image sensors or pixels arranged in mutually orthogonal rows and columns, and operative for detecting return light captured by the respective lens group over an imaging fields of view (FOV) along imaging axes that are each normal to the substantially flat image sensors. The return light is scattered and/or reflected from objects over the FOV. In some embodiments, the imaging axes are each coaxial with a central axis of the respective lens group, each of which is operative for focusing the return light onto the array of pixels to enable focused capture of image data of an environment appearing within the respective FOVs. In particular, the light that impinges on the pixels is sensed and the output of those pixels produce image data that is associated with the environment that appears within the FOV (which can include the target). This image data may be processed by the controller 144. Additionally, or alternatively, it may be processed by a separate supplemental controller which may be disposed within or otherwise coupled with the reader accessory 260. Furthermore, controllers may be communicatively coupled with each other to enable desired functionality.

The reader accessory 260 may include an accessory housing 262 having an arm 262a operably connecting respective first and second supplemental sensing housings 264a, 264b. In some implementations, the arm 262a may include an interior cavity that houses electronics, data and/or power communication cables, and/or interconnects 263. Each of the supplemental housings 264a, 264b include an interior cavity that accommodate at least a portion of the supplemental sensing assemblies 261. Further, the reader accessory 260 includes any number of coupling regions 267 that allow the reader accessory 260 to be operably coupled with the imaging system 100. More specifically, in some examples, the reader accessory 260 may couple (e.g., removably couple) with a portion (e.g., the frame 115) of the lower housing 112, the platter 111, and/or the frame member 102a of the workstation 102. Such removable couplings may be provided in any suitable manner such as, for example, a friction-fit coupling, a notch-and-protrusion coupling, and/or by using fasteners or other securing mechanisms. Other examples are possible.

As with the reader accessory 160, the reader accessory 260 is thermally coupled with the platter frame 113 and/or the support frame 115 to dissipate generated thermal energy. More specifically, a portion of the accessory housing 262 may define an opening (not illustrated) or cutout that is positioned near the electronics 263. In such arrangements, a thermal transmitter 266 in the form of a thermal pad may be positioned adjacent to and/or within the opening such that the thermal transmitter 266 is thermally coupled with the electronics 263. Other examples of a thermal transmitter may include thermal paste or any other thermally conductive material that can be attached between a heat source and a heatsink so as to enable heat to transfer from the heat source to the heatsink. This thermal transmitter 266 may also be positioned adjacent to the frame member 115 and/or the platter frame 113 on its opposite side to form a thermal flow path 268 (FIG. 9) between the reader accessory 260 and the frame member 115 and/or the platter frame 113.

In some alternative arrangements, the accessory housing 262 itself may be constructed from a thermally conductive material. In these arrangements, a thermal transmitter may be disposed within the accessory housing 262 between the electronics and the accessory housing 262 in a similar manner as described with respect to the reader accessory 160 above. Accordingly, the accessory housing 262 may be thermally coupled with the frame member 115 and/or the platter frame 113 by positioning the accessory housing 262 such that it abuts a portion of the frame member 115 and/or the platter frame 113.

Further, it is to be appreciated that the reader accessory may be provided in any number of supplemental assemblies. For example, the supplemental assembly may be in the form of a barcode imager, a color vision camera, a host module, a proximity sensor, an IR sensor, a 3D sensor, and/or an off-platter detection sensor. Other examples are possible.

The barcode reader 106 may have any number of alternative or additional components to assist with operability. For example, the thermal pads described herein may be provided in the form of leaf spring thermal pads. Other examples are possible. Additionally, in some examples, the platter frame 113 and/or the frame member 115 may include any number of ribs or fins 117 to assist with heat dissipation. Further still, in some examples, one or both of the platter frame 113 and the frame member 115 may be operably and thermally coupled with a heat-dissipative ground that is external to the reader 106. As an example, the frame member 102a may operate as such a heat-dissipative ground, thereby providing additional heat dissipation by way of a larger heat sink area.

So arranged, the reader accessories provided herein are both removably and thermally coupled with the barcode reader, and take advantage of the integrated frame elements to dissipate generated heat. As a result, these accessories, which are typically confined to a small volume within the barcode reader, may more effectively manage heat generation. In some arrangements, the reader accessories may include components to provide for a "plug-and-play" arrangement whereby power and/or data transmission may be quickly initiated via the use of electronic couplings and/or connectors while still allowing for thermal coupling between components.

The above description may refer to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader comprising:
a housing having (i) a lower housing portion with an upper surface facing a product scanning region and a substantially horizontal window, the lower housing portion including a housing frame, and (ii) an upper housing portion extending above the lower housing portion with a substantially upright window;
a platter configured to support an object placed thereon, the platter having:
a central region extending in a transverse plane, the central region including a platter window configured to permit light to pass therethrough;
a platter frame;
an imaging assembly having an imaging sensor, the imaging assembly having a field of view (FOV) directed through at least one of the substantially horizontal window or the substantially upright window; and
a reader accessory removably coupled with at least one of the lower housing portion or the platter frame, the reader accessory including a thermal transmitter adapted to remove thermal energy generated by the reader accessory therefrom;
wherein the thermal transmitter is thermally coupled with at least one of the housing frame or the platter frame to transfer the thermal energy generated by the reader accessory thereto.

2. The barcode reader of claim 1, wherein the reader accessory comprises a supplemental module removably coupled with at least one of the lower housing portion or the platter frame, the supplemental module including at least one supplemental sensing assembly.

3. The barcode reader of claim 2, wherein the thermal transmitter comprises a thermally conductive material positioned at or near a portion of the supplemental sensing assembly.

4. The barcode reader of claim 3, wherein the thermally conductive material comprises at least a portion of the supplemental module housing.

5. The barcode reader of claim 3, wherein the supplemental module includes a supplemental module housing having an opening extending therethrough, wherein the thermally conductive material is at least partially disposed through the opening of the supplemental module housing.

6. The barcode reader of claim 2, wherein the supplemental sensing assembly comprises at least one of a barcode imager, a vision camera, a proximity sensor, an IR sensor, a 3D sensor, or an off-platter detection sensor.

7. The barcode reader of claim 1, wherein the reader accessory comprises a supplemental processing assembly having at least one circuit board and a supplemental processing housing operably coupled therewith.

8. The barcode reader of claim 7, wherein the thermal transmitter comprises at least a portion of the supplemental processing housing.

9. The barcode reader of claim 8, wherein the supplemental processing housing includes a thermal flow path comprising a region having an increased cross-sectional dimension relative to a remainder of the supplemental processing housing, the thermal flow path adapted to direct thermal energy to the housing frame and/or the platter frame.

10. The barcode reader of claim 1, wherein at least one of the housing frame or the platter frame is constructed from a metallic material.

11. The barcode reader of claim 1, wherein the housing frame includes at least one of a diecast frame or a sheet frame.

12. The barcode reader of claim 1, wherein at least one of the housing frame or the platter frame includes at least one rib or fin to assist with heat dissipation.

13. The barcode reader of claim 1, wherein at least one of the housing frame or the platter frame is coupled with a heat-dissipative ground external to the reader.

14. A barcode reader comprising:
a housing having (i) a lower housing portion with an upper surface facing a product scanning region and a substantially horizontal window and (ii) an upper housing portion extending above the lower housing portion with a substantially upright window;
a platter configured to support an object placed thereon, the platter having a central region extending in a transverse plane, the central region including a platter window configured to permit light to pass therethrough;
an imaging assembly having an imaging sensor, the imaging assembly having a field of view (FOV) directed through at least one of the substantially horizontal window or the substantially upright window;
a frame member adapted to provide structural support to at least one of the housing or the platter; and
a reader accessory removably coupled with at least one of the lower housing portion or the platter, the reader accessory including a thermal transmitter adapted to remove thermal energy generated by the reader accessory therefrom;
wherein the thermal transmitter is thermally coupled with the frame member to transfer the thermal energy generated by the reader accessory thereto.

15. The barcode reader of claim 14, wherein the reader accessory includes an accessory housing, the thermal transmitter comprising a thermally conductive material positioned at or near a portion of the reader accessory that generates thermal energy.

16. The barcode reader of claim 15, wherein the thermally conductive material comprises at least a portion of the accessory housing.

17. The barcode reader of claim 15, wherein the accessory housing includes an opening extending therethrough, wherein the thermally conductive material is at least partially disposed through the opening of the accessory housing.

18. The barcode reader of claim 14, wherein the reader accessory includes an accessory housing, the thermal transmitter comprising a thermal flow path defined by a region on the accessory housing having an increased cross-sectional dimension relative to a remainder of the accessory housing, the thermal flow path adapted to direct thermal energy to the frame member.

19. The barcode reader of claim 14, wherein the reader accessory includes at least one of:
a color vision camera operably coupled with the platter;
a host module operably coupled with a portion of the housing;
a supplemental processing assembly having at least one circuit board and a supplemental processing housing operably coupled therewith; or a supplemental module removably coupled with at least one of the lower housing portion or the platter, the supplemental module including at least one supplemental sensing assembly.

20. The barcode reader of claim 14, wherein at least a portion of the frame member is constructed from a metallic material.

21. The barcode reader of claim 14, wherein the frame member includes at least one rib or fin to assist with heat dissipation.

22. A barcode reader comprising:
a housing having (i) a lower housing portion with an upper surface facing a product scanning region and a substantially horizontal window and (ii) an upper housing portion extending above the lower housing portion with a substantially upright window;
a platter configured to support an object placed thereon, the platter having a central region extending in a transverse plane, the central region including a platter window configured to permit light to pass therethrough;
an imaging assembly having an imaging sensor, the imaging assembly having a field of view (FOV) directed through at least one of the substantially horizontal window or the substantially upright window;
a reader accessory removably coupled with at least one of the lower housing portion or the platter, the reader accessory including a thermal transmitter adapted to remove thermal energy generated by the reader accessory therefrom; and
a thermal dissipation device operably coupled with the thermal transmitter, the thermal dissipation device adapted to dissipate the thermal energy generated by the reader accessory.

23. A barcode reader comprising:
a housing having (i) a lower housing portion with an upper surface facing a product scanning region and a substantially horizontal window, the lower housing portion defining a perimeter region, and (ii) an upper housing portion extending above the lower housing portion with a substantially upright window;
a support frame positioned around or within the perimeter region of the lower housing portion;
a heat-generating element associated with the barcode reader, the heat-generating element being thermally coupled with the support frame such that the support frame dissipates thermal energy generated by the heat-generating element.

24. The barcode reader of claim 23, wherein the heat-generating element includes a thermal transmitter operably coupled therewith.

25. The barcode reader of claim 24, wherein the thermal transmitter comprises a thermally conductive material positioned at or near a portion of the supplemental imaging assembly.

26. The barcode reader of claim 24, wherein the thermal transmitter comprises a thermal flow path defined by a region of a housing of the heat-generating element having an increased cross-sectional dimension relative to a remainder of the housing, the thermal flow path adapted to direct thermal energy to the support frame.

* * * * *